W. JONES.
Hemp Brake.
No. 31,245.  Patented Jan. 29, 1861.
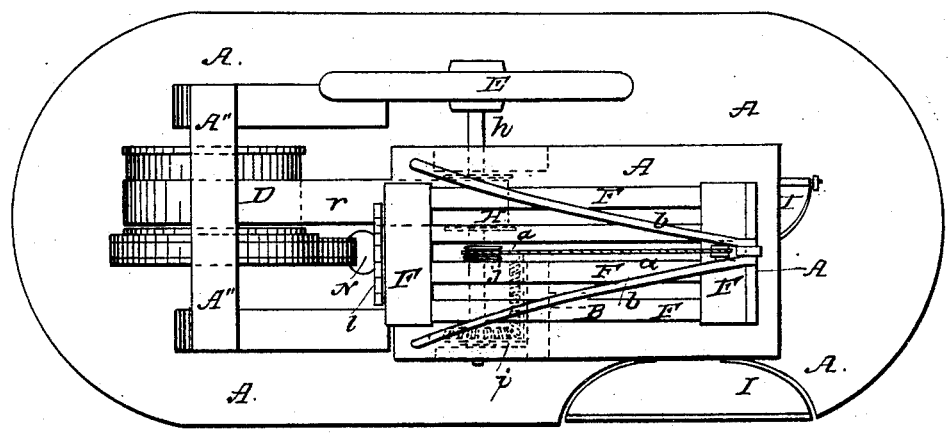
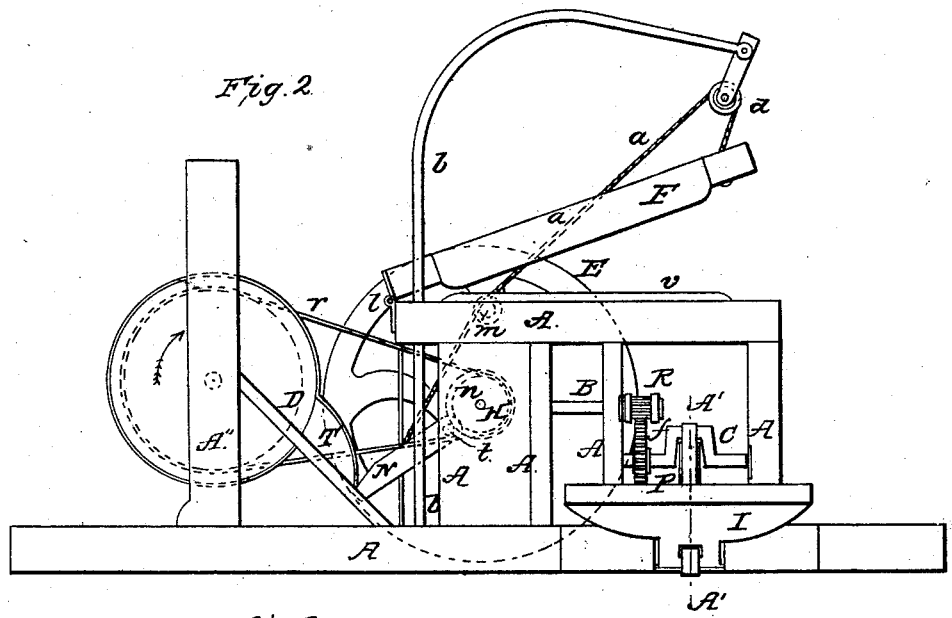
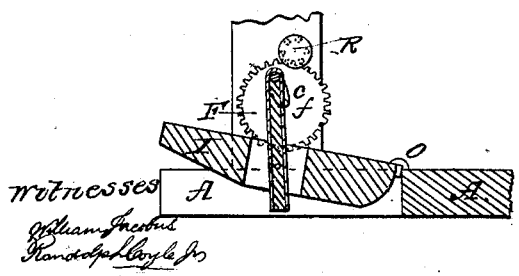

UNITED STATES PATENT OFFICE.

WILLIAM JONES, OF ST. LOUIS, MISSOURI.

IMPROVEMENT IN HEMP-BRAKES.

Specification forming part of Letters Patent No. 31,245, dated January 29, 1861.

*To all whom it may concern:*

Be it known that I, WILLIAM JONES, of the city and county of St. Louis and State of Missouri, have invented a new and useful Improvement in Hemp-Brakes; and I do hereby declare that the following is a full, clear, and exact description of the same, reference being had to the annexed drawings, making part of this specification, in which—

Figure 1 is a top view of my said invention; Fig. 2, a side elevation thereof, and Fig. 3 is a section on the line A' A'.

My invention consists of a novel arrangement of mechanical devices in combination for the purpose of forming a cheap, simple, and efficient hemp-brake to be worked by the foot of the operator.

The following description will enable any one skilled in the arts to which my invention appertains to make and use the same.

The frame of my machine is represented in the drawings by A, and upon this frame the different parts of my machine are arranged in the following order and relation: In the upper part of the frame I make the brake-bed $v$, which is of the ordinary description. Over this brake-bed I arrange the brake F, which is also of the ordinary kind, and which has its lower or inside end united to the frame by a hinge, $l$. In the back end or part of the frame I arrange two spring-bars, $b\ b$, which I bring together at the front ends, and unite them on a block and sheave, $d$. Over this sheave I lead a cord or rope, $a$, from the lifter N over the sheave $m$ to the out end of the brake F, to which it is attached. The object in using and arranging the spring-bars or standards $b$ in the manner here shown and described is to furnish means to raise the brake through a yielding medium, so as to relieve the machinery of the jar it would otherwise have by reason of the action of the arm T on the lifter N, and at the same time leave the front part of the machine clear of all obstruction. The lifter N is fixed upon a pivot, $t$, so as to vibrate freely on a vertical plane, whereby the brake is made to rise and fall whenever the lifter is operated on by any force moving in a vertical plane.

For the purpose of operating this lifter, and consequently the brake, I fix the drum D on a suitable shaft arranged in the frame-piece A'', and on one side of the periphery of the said drum I make the arm or projection T, and arrange the drum so as to cause the said arm to move on the same plane that the lever or lifter N does, whereby the said arm is brought in contact with the said lifter, when the drum is made to rotate in the direction of the arrow, and thus give motion to the brake. To give motion to the drum D, I arrange a treadle, I, in the lower part of the frame, as shown in Fig. 3, and attach it to a crank, $c$, by means of a connecting-rod, P, and upon the crank-shaft I fix a spur-wheel, $f$, so as to mesh in a pinion, R, fixed on the end of the shaft B, on the opposite end of which shaft I fix a bevel-wheel, $j$, to mesh in a second bevel-wheel, $i$, on the shaft $n$, which is arranged at right angles with the shaft B. On the shaft $n$, I fix a small drum, H, from whence I lead a belt over the drum D, which thus conveys motion from the treadle I to the drum last mentioned. Upon the out end of the shaft $n$, I fix a heavy fly-wheel, to give regularity to the motion of the machine. By this arrangement and combination of devices a cheap, simple, and efficient hemp-brake is obtained, which a man may feed with his hands and operate with his foot, whereby he can soon break up a small crop of hemp without assistance.

Having thus described the construction and operation of my invention, what I claim as my invention, and desire to secure by Letters Patent, is—

The arrangement of the lifter N, the arm on the drum D, the cord $a$, and spring-standards $b$, in the manner described, for the purpose of operating the brake E.

In testimony that this is a true description of my improved hemp-brake I hereunto set my hand this 20th day of November, 1860.

WILLIAM JONES.

Witnesses:
ROLLIN B. GRAY,
JOHN K. HALE.